United States Patent
Zha

(10) Patent No.: US 10,261,988 B2
(45) Date of Patent: Apr. 16, 2019

(54) METHOD, APPARATUS AND TERMINAL FOR MATCHING EXPRESSION IMAGE

(71) Applicant: Tencent Technology (Shenzhen) Company Limited, Shenzhen, Guangdong (CN)

(72) Inventor: Wen Zha, Shenzhen (CN)

(73) Assignee: Tencent Technology (Shenzhen) Company Limited, Shenzhen, Guangdong (CN)

(*) Notice: Subject to any disclaimer, the term of this patent is extended or adjusted under 35 U.S.C. 154(b) by 22 days.

(21) Appl. No.: 15/487,470

(22) Filed: Apr. 14, 2017

(65) Prior Publication Data

US 2017/0220551 A1    Aug. 3, 2017

Related U.S. Application Data

(63) Continuation of application No. PCT/CN2015/098078, filed on Dec. 21, 2015.

(30) Foreign Application Priority Data

Jan. 7, 2015    (CN) .......................... 2015 1 0008126

(51) Int. Cl.
*G06F 17/27*    (2006.01)
*G06F 3/0481*    (2013.01)
(Continued)

(52) U.S. Cl.
CPC .......... *G06F 17/276* (2013.01); *G06F 3/0236* (2013.01); *G06F 3/0481* (2013.01);
(Continued)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 6,351,745 B1 * 2/2002 Itakura ................. G06F 3/1423
6,990,452 B1 * 1/2006 Ostermann ........... G06F 17/241
345/473
(Continued)

FOREIGN PATENT DOCUMENTS

CN    102054033 A    5/2011
CN    104035655 A    9/2014
(Continued)

OTHER PUBLICATIONS

English translation of Korean Office Action for Application No. 10-2017-7012107 dated Apr. 30, 2018.
(Continued)

*Primary Examiner* — Lamont M Spooner
(74) *Attorney, Agent, or Firm* — Harness, Dickey & Pierce, P.L.C.

(57) ABSTRACT

An expression image matching method includes obtaining an identity of a session in which a user chats, the session being a dialog set in which the user chats with at least one other user. The method determines, according to a white list and the identity of the session, whether to provide an expression image to the user, and the white list comprising an identity of a session in which a frequency of using expression images meets a predefined condition. The method provides an expression image matching with chat content input by the user when determining to provide the expression image to the user.

17 Claims, 6 Drawing Sheets

(51) Int. Cl.
*G06F 9/451* (2018.01)
*H04L 12/58* (2006.01)
*G06F 3/023* (2006.01)

(52) U.S. Cl.
CPC ............ *G06F 9/451* (2018.02); *G06F 17/279* (2013.01); *H04L 51/046* (2013.01); *H04L 51/063* (2013.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795
USPC .................................................. 704/1, 9, 10
See application file for complete search history.

(56) References Cited

U.S. PATENT DOCUMENTS

| | | | | |
|---|---|---|---|---|
| 8,521,533 | B1* | 8/2013 | Ostermann | G09B 21/009 704/260 |
| 2002/0095407 | A1* | 7/2002 | Itakura | G06F 3/1423 |
| 2005/0071767 | A1* | 3/2005 | Kirkland | H04M 1/72555 715/753 |
| 2009/0288152 | A1* | 11/2009 | Huber | G06Q 20/1235 726/6 |
| 2010/0004029 | A1* | 1/2010 | Kim | G06F 1/1624 455/566 |
| 2010/0088616 | A1* | 4/2010 | Park | G06F 3/0236 715/762 |
| 2011/0055336 | A1* | 3/2011 | Park | G06Q 10/107 709/206 |
| 2011/0294525 | A1 | 12/2011 | Jonsson | |
| 2013/0002683 | A1* | 1/2013 | Li | G06F 17/211 345/473 |
| 2014/0067818 | A1* | 3/2014 | Bao | G06F 17/3089 707/740 |
| 2014/0279418 | A1* | 9/2014 | Rubinstein | G06Q 40/00 705/39 |
| 2014/0298364 | A1* | 10/2014 | Stepanov | H04N 21/25 725/10 |
| 2014/0303982 | A1* | 10/2014 | Yun | G06F 3/013 704/270 |
| 2014/0324885 | A1* | 10/2014 | McKenzie | G06F 17/30268 707/748 |
| 2015/0121256 | A1* | 4/2015 | Kim | G06Q 10/10 715/758 |
| 2015/0286371 | A1* | 10/2015 | Degani | G06F 17/274 705/14.64 |
| 2015/0293903 | A1* | 10/2015 | Baron | G06F 17/274 704/9 |
| 2016/0006679 | A1* | 1/2016 | Williams | H04L 12/1859 455/466 |
| 2016/0259502 | A1* | 9/2016 | Parrott | G06F 3/0482 |
| 2017/0052946 | A1* | 2/2017 | Gu | G06F 17/279 |
| 2017/0180276 | A1* | 6/2017 | Gershony | H04L 51/02 |
| 2017/0270087 | A1* | 9/2017 | Leydon | G07F 17/3244 |
| 2018/0006981 | A1* | 1/2018 | Nassi | G06Q 10/107 |

FOREIGN PATENT DOCUMENTS

| | | |
|---|---|---|
| CN | 104063427 A | 9/2014 |
| CN | 104618222 A | 5/2015 |
| JP | 2005276103 A | 10/2005 |
| JP | 2011138343 A | 7/2011 |
| JP | 2013206389 A | 10/2013 |
| TW | 200913579 A | 3/2009 |

OTHER PUBLICATIONS

International Search Report for Application No. PCT/CN2015/098078 dated Mar. 14, 2016.
International Preliminary Report for Application No. PCT/CN2015/098078 dated Jul. 11, 2017.

* cited by examiner

METHOD, APPARATUS AND TERMINAL FOR MATCHING EXPRESSION IMAGE

CROSS-REFERENCE TO RELATED APPLICATIONS

This application is a continuation of International Patent Application No. PCT/CN2015/098078 filed on Dec. 21, 2015. This application claims the benefit and priority of Chinese Application No. 201510008126.8, filed on Jan. 7, 2015. The entire disclosures of each of the above applications are incorporated herein by reference.

FIELD

The present disclosure relates to Internet communication technologies and to an expression image matching method, apparatus and terminal.

BACKGROUND

This section provides background information related to the present disclosure which is not necessarily prior art.

A user often chats with friends through a social application. When chatting with a friend, the user may send expression images to the friend to increase interest of the chat. In order to increase the click rate of expression images, a terminal may provide an expression image matching with chat content of the user, so that the user may click and use the expression image conveniently.

One expression image corresponds to at least one word. The word may be used to describe emotion or thought expressed by the expression image. When the user chats with a friend, the terminal may provide expression images matching with chat content to the user through the following methods. The terminal obtains the chat content input by the user, determines whether the chat content includes a word corresponding to an expression image, and when determining that the chat content includes a word corresponding to an expression image, provides the expression image to the user. Through this method, the user may conveniently click the expression image.

In some scenarios, the user rarely uses expression images when chatting with a friend. In this case, if the terminal provides expression images to the user, the user will be disturbed. For example, the user does not like to use expression images, or the user is chatting with a colleague or a boss, and thus it is improper to use expression images because the discussed topic is serious. In this case, if the terminal provides expression images to the user, the user will be disturbed.

SUMMARY

This section provides a general summary of the disclosure, and is not a comprehensive disclosure of its full scope or all of its features.

In order to avoid disturbing a user when providing expression images, the present disclosure provides an expression image matching method, apparatus and terminal. The technical method of the present disclosure is implemented as follows:

An expression image matching method includes:
obtaining an identity of a session in which a user chats, the session being a dialog set in which the user chats with at least one other user;
determining, according to a white list and the identity of the session, whether to provide an expression image to the user, the white list comprising an identity of a session in which a frequency of using expression images meets a predefined condition; and
providing an expression image matching with chat content input by the user when determining whether to provide the expression image to the user.

An expression image matching apparatus includes:
an obtaining module, configured to obtain an identity of a session in which a user chats, the session being a dialog set in which the user chats with at least one other user;
a determining module, configured to determine, according to a white list and the identity of the session, whether to provide an expression image to the user, and the white list including an identity of a session in which a frequency of using expression images meets a predefined condition; and
a matching module, configured to provide an expression image matching with chat content input by the user when determining whether to provide the expression image to the user.

A terminal includes:
one or more processors and a storage, wherein
the storage is configured to store one or more programs, and the one or more programs are configured to be executed by the one or more processors, and comprise instructions for performing the following operations of:
obtaining an identity of a session in which a user chats, the session being a dialog set in which the user chats with at least one other user;
determining, according to a white list and the identity of the session, whether to provide an expression image to the user, and the white list comprising an identity of a session in which a frequency of using expression images meets a predefined condition; and
providing an expression image matching with chat content input by the user when determining whether to provide the expression image to the user.

In the various embodiments of the present disclosure, the identity of the session in which the user chats is obtained. According to the white list and the identity of the session, it is determined whether to provide an expression image to the user. The white list includes an identity of a session in which a frequency of using expression images meets a predefined condition. When determining whether to provide an expression image to the user, an expression image matching with the chat content input by the user is provided to the user. Because the identity of the session in which the frequency of using expression images meets the predefined condition is added to the white list, it can be determined whether to provide an expression image to the user according to the white list and the identity of the session. In this way, it can be determined whether it is proper to use expression images in the session, so as to avoid disturbing the user when providing expression images to the user.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2-1 is a flowchart illustrating an expression image matching method according to various embodiments of the present disclosure.

FIG. 2-2 is a diagram illustrating a first chat window according to various embodiments of the present disclosure.

FIG. 2-3 is a diagram illustrating a second chat window according to various embodiments of the present disclosure.

FIG. 2-4 is a diagram illustrating a third chat window according to various embodiments of the present disclosure.

FIG. 3 is a flowchart illustrating an expression image matching method according to various embodiments of the present disclosure.

FIG. 4 is a flowchart illustrating an expression image matching method according to various embodiments of the present disclosure.

Corresponding reference numerals indicate corresponding parts throughout the several views of the drawings.

DETAILED DESCRIPTION

Example embodiments will now be described more fully with reference to the accompanying drawings.

In order to make the object, technical solution and merits of the present application clearer, the present application will be illustrated in detail hereinafter with reference to the accompanying drawings and embodiments.

Figure 1:
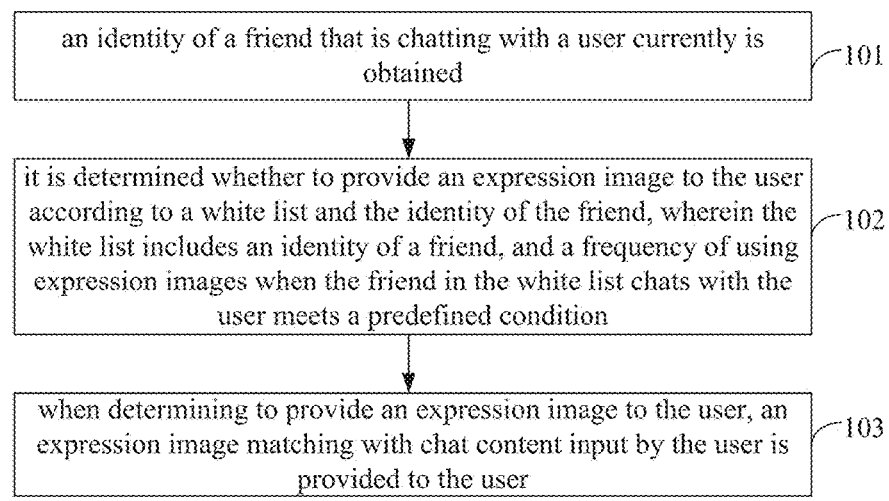
FIG. 1 is a flowchart illustrating an expression image matching method according to various embodiments of the present disclosure.

In FIG. 1, various embodiments of the present disclosure provide an expression image matching method. The method includes the following blocks.

Block 101: An identity of a friend that is currently chatting with a user is obtained.

Block 102: It is determined whether to provide an expression image to the user according to a white list and the identity of the friend, wherein the white list includes an identity of a friend and a frequency of using expression images when the friend in the white list chats with the user meets a predefined condition.

Block 103: When determining whether to provide an expression image to the user, an expression image matching with chat content input by the user is provided to the user.

According to various embodiments, before obtaining the identity of the friend that is currently chatting with the user, the method further includes:
  calculating a frequency of using expression images when the user chats with each friend according to a chat history of the user, wherein the chat history includes messages that were generated when the user chatted with each friend in the past; and
  adding an identity of a friend to the white list if a frequency of using expression images when the friend added to the white list chats with the user meets a first predefined condition.

According to various embodiments, a process of calculating the frequency of using expression images when the user chats with each friend according to the chat history of the user includes:
  obtaining, from the chat history of the user, messages that were generated when the user chatted with a first friend in the past, wherein the first friend is any friend of the user;
  counting the number of the obtained messages and the number of messages containing expression images among the obtained messages; and
  calculating a frequency of using expression images when the user chats with the first friend according to the number of the chat history message containing expression images and the number of the obtained messages.

According to various embodiments, a process of adding the identity of the friend to the white list if the frequency of using expression images when the friend added to the white list chats with the user meets the first predefined condition, includes:
  adding the identity of the friend to the white list if the frequency of using expression images when the friend added to the white list chats with the user is larger than a predefined frequency threshold, or
  calculating an average frequency according to the frequency of using expression images when the user chats with each friend, and adding the identity of the friend to the white list if the frequency of using expression images when the friend added to the white list chats with the user is larger than the average frequency.

According to various embodiments, after adding the identity of the friend to the white list if the frequency of using expression images when the friend added to the white list chats with the user meets the first predefined condition, the method further includes:
  obtaining a frequency of the user sending expression images and a frequency of a second friend sending expression images, wherein the second friend is a friend of the user excluded from the white list; if a comparing result between the frequency of the user sending expression images and the frequency of the second friend sending expression images meets a second predefined condition, adding an identity of the second friend to the white list.

According to various embodiments, a process of providing the expression image matching with the chat content input by the user includes:
  obtaining an expression word contained in the chat content input by the user;
  obtaining an expression image corresponding to the expression word;
  determining the number of sending operations performed for the obtained expression image according to a relationship between the obtained expression image, the number of sending operations performed for the obtained expression image, and the identity of the friend; and
  displaying the obtained expression image to the user according to the number of sending operations performed for the expression image.

According to various embodiments, before obtaining the expression word contained in the chat content input by the user, the method further includes:
  obtaining an expression image sent by the user and the number of sending operations performed for the expression image from the messages that were generated when the user chatted with the friend in the past, and storing the relationship between the expression image, the number of sending operations performed for the expression image, and the identity of the friend.

According to various embodiments, a process of providing the expression image matching with the chat content input by the user includes:

if an average frequency of the user using expression images is smaller than a predefined average frequency, determining that the user uses less expression images, and decreasing a frequency of providing expression images to the user.

According to various embodiments of the present disclosure, the identity of the friend that is currently chatting with the user is obtained. According to the white list and the identity of the friend, it is determined whether to provide an expression image to the user. The white list includes an identity of a friend, wherein a frequency of using expression images when the friend in the white list chats with the user meets a predefined condition. When determining whether to provide an expression image to the user, an expression image matching with the chat content input by the user is provided to the user. Because the identity of the friend is added to the white list if the frequency of using expression images when the friend added to the white list chats with the user meets the predefined condition, it can be determined whether to provide an expression image to the user according to the white list and the identity of the friend. In this way, it can be determined whether it is proper to use expression images when the user chats with the friend, so as to avoid disturbing the user when providing expression images to the user.

Figures 1, 2:
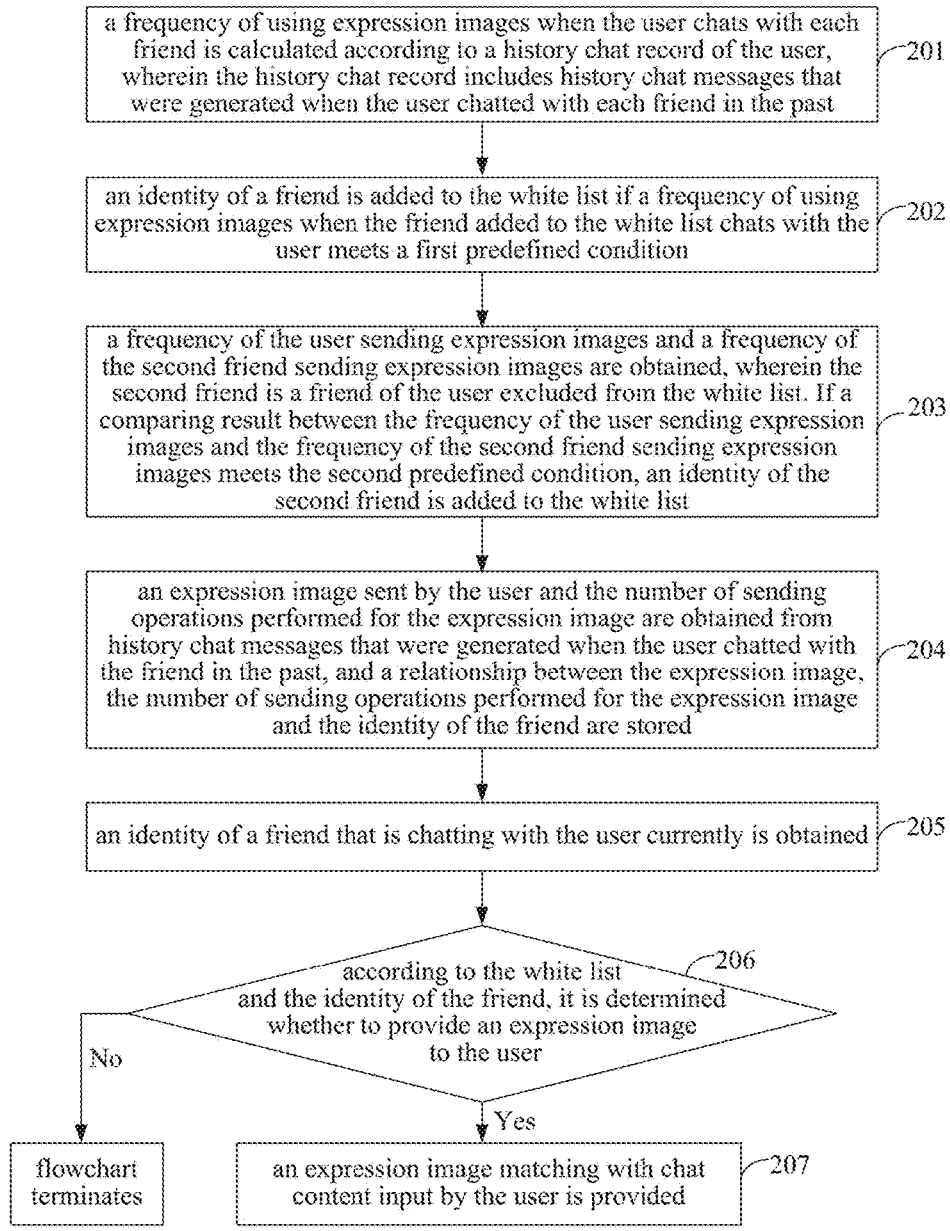
Figure 2:
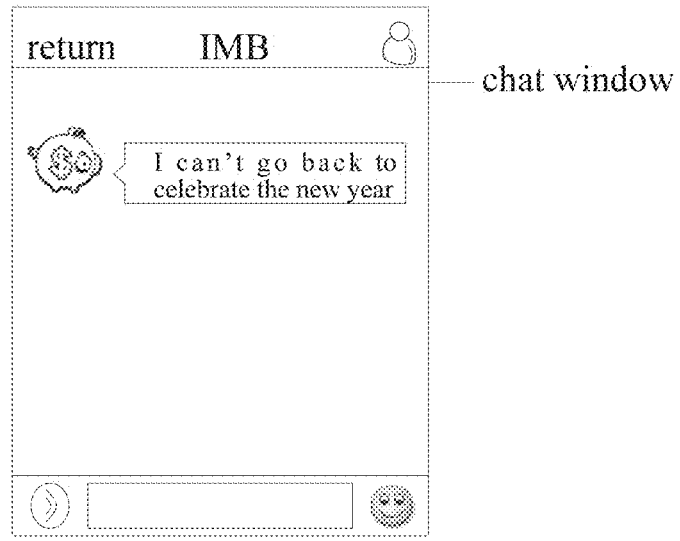

In FIG. 2-1, various embodiments of the present disclosure provide a flowchart illustrating an expression image matching method. A body executing the method may be a terminal. The method includes the following blocks.

Before providing an expression image to a user, a white list corresponding to the user may be set first according to the following blocks 201-203. The white list includes an identity of a friend, wherein a frequency of using expression images when the friend added to the white list chats with the user meets a predefined condition.

Block 201: A frequency of using expression images when the user chats with each friend is calculated according to a chat history of the user, wherein the chat history includes messages that were generated when the user chatted with each friend in the past. The chat history of the user is stored in a server. The chat history of the user includes chat messages that were generated when the user chatted with each friend in a recent period of time. For example, the chat history may include chat messages that were generated when the user chatted with each friend in the past week.

In this block, a request message for obtaining the chat history is sent to the server. The request message contains an identity of the user, so that the server may obtain the chat history of the user according to the identity of the user. The chat history of the user sent by the server is received. A friend is selected from all friends of the user, and is determined as a first friend. messages that were generated when the user chatted with the first friend in the past are obtained from the chat history of the user. The number of the obtained messages and the number of messages containing expression images among the obtained messages are counted. A frequency of using expression images when the user chats with the first friend according to the number of the obtained messages and the number of the messages containing expression images is calculated. Similar to the above process performed for the first friend, a frequency of using expression images when the user chats with each friend may be calculated.

According to various embodiments, a ratio of the number of the messages containing expression images to the number of the obtained messages may be calculated, and may be determined as the frequency of using expression images when the user chats with the first friend.

For example, suppose a chat history of user A includes messages that were generated when the user A chatted with users B, C, and D in the past, and the first friend is the user B. The chat messages that were generated when the user A chatted with the first friend (i.e., the user B, called the first friend B) in the past are obtained from the history chat record of the user A. Suppose the number of the messages that were generated when the user A chatted with the first friend B in the past is 100, and the number of messages containing expression images is 50. That is, the number of the obtained messages is 100, and the number of the messages containing expression images among the obtained messages is 50. According to the number of the messages containing expression images (i.e., 50) and the number of the obtained messages (i.e., 100), a frequency of using expression images when the user A chats with the first friend B is calculated to obtain a value 0.5. Suppose the number of the messages that were generated when the user A chatted with the friend C in the past is 200, the number of messages containing expression images is 40, the number of the messages that were generated when the user A chatted with the friend D in the past is 100, and the number of messages containing expression images is 30. According to the above process, a frequency of using expression images when the user A chats with the friend C is calculated to obtain a value 0.2, and a frequency of using expression images when the user A chats with the friend D is calculated to obtain a value 0.3.

After obtaining the frequency of using expression images when the user chats with each friend according to the above block 201, the white list may be set according to following blocks 202 and 203.

Block 202: An identity of a friend is added to the white list if a frequency of using expression images when the friend added to the white list chats with the user meets a first predefined condition. According to different first predefined conditions, block 202 may be implemented through following first and second methods.

In a first method, the first predefined condition is that of a frequency of using expression images when a friend chats with the user is larger than a predefined frequency threshold. Accordingly, an identity of a friend is added to the white list if a frequency of using expression images when the friend added to the white list chats with the user is larger than the predefined frequency threshold. The frequency of using expression images when the user chats with each friend compares with the predefined frequency threshold, a friend is selected from all friends of the user if a frequency of using expression images by the selected friend is larger than the predefined frequency threshold, and an identity of the selected friend is added to the white list. For example, suppose the predefined frequency threshold is 0.4. The identity (i.e., IMB) of the friend B is added to the white list if a frequency of using expression images when the friend B chats with the user A is larger than the predefined frequency threshold 0.4.

In the second method, the first predefined condition is that of a frequency of using expression images when a friend chats with the user is larger than an average frequency. Accordingly, an identity of a friend is added to the white list if a frequency of using expression images when the friend added to the white list chats with the user is larger than the average frequency. According to the frequency of using expression images when the user chats with each friend, an average frequency is calculated, and an identity of a friend is added to the white list if a frequency of using expression images when the friend added to the white list chats with the user is larger than the average frequency. The average frequency may be calculated according to a following method. The frequency of using expression images when the user chats with each friend is calculated first, and then a sum of all frequencies is calculated to obtain a total frequency. The number of all friends of the user are counted, a ratio of the total frequency to the number of all friends of the user is calculated, and is determined as the average frequency.

For example, a frequency of using expression images when the user A chats with each of the friends B, C, and D is calculated first, and then a sum of all frequencies is calculated to obtain a total frequency 1. The number of all friends of the user A is counted to obtain a value 3, a ratio of the total frequency (i.e., 1) to the number of all friends of the user A (i.e., 3) is calculated to obtain a value 0.33, and the ratio 0.33 is determined as the average frequency. The identity of the friend B is added to the white list because the frequency of using expression images when the friend B chats with the user A is larger than the average frequency 0.33.

A chat group may be established in a social application. The chat group includes multiple members. The user may chat with other members in the chat group at the same time. According to various embodiments of the present disclosure, when calculating the frequency of using expression images when the user chats with each friend and the average frequency, the chat group is taken as one friend of the user.

When the average frequency of the user is smaller than a predefined average frequency, it can be determined that the user uses less expression images and, thus, a frequency of providing expression images to the user may be decreased. The predefined average frequency may be an average value of frequencies of using expression images by all users in the social application. Those skilled may count the average frequency of each user in the social application, calculate an average value of all average frequencies, and determine the average value as the predefined average frequency.

The frequency of providing expression images to the user may be decreased through the following first and second methods.

In the first method, one expression image matching operation is performed for the user for each of the predefined number of messages. For example, once the expression image matching operation is performed for the user every three messages. Suppose the user inputs five messages. When the user inputs the first message, the expression image matching operation is performed for the user. When the user inputs the second, third, and fourth messages, no expression image matching operation is performed for the user. When the user inputs the fifth message, the expression image matching operation is performed for the user.

In the second method, one expression image matching operation is performed for the user for a preset period of time and when the user inputs a message. For example, suppose one expression image matching operation is performed for the user every half hour. The user chats with a friend during a period of time from 1:00 to 2:00, and inputs a message at 1:00, 1:20, and 1:30, respectively. Accordingly, when the user inputs the message at 1:00, one expression image matching operation is performed for the user. When the user inputs the message at 1:20, no expression image matching operation is performed for the user. When the user inputs the message at 1:30, one expression image matching operation is performed for the user. If the user does not input the message at 1:30, no expression image matching operation is performed for the user.

After setting the white list according to block 202, an identity of a friend meeting a second predefined condition may be added to the white list according to the following block 203.

Block 203: A frequency of the user sending expression images and a frequency of the second friend sending expression images are obtained, wherein the second friend is a friend of the user excluded from the white list. If a comparing result between the frequency of the user sending expression images and the frequency of the second friend sending expression images meets the second predefined condition, an identity of the second friend is added to the white list.

The second predefined condition may be that the frequency of the second friend sending expression images is larger than the frequency of the user sending expression images, or may be that the frequency of the second friend sending expression images is a predefined multiple of the frequency of the user sending expression images. During a chat process in which the user chats with the friend, if the frequency of the friend sending expression images is high, it can be determined that the user may accept matched expression images. Accordingly, the identity of the friend may be added to the white list corresponding to the user.

According to various embodiments, a friend is selected from friends excluded from the white list, and is taken as the second friend. Messages that were generated when the user chatted with the second friend in the past are obtained from the chat history of the user. According to the obtained messages, the number of messages sent by the user, the number of messages containing expression images sent by the user, the number of messages sent by the second friend, and the number of messages containing expression images sent by the second friend are counted. According to the number of messages containing expression images sent by the user and the number of messages sent by the user, the frequency of the user sending expression images is calculated. According to the number of messages containing expression images sent by the second friend and the number of messages sent by the second friend, the frequency of the second friend sending expression images is calculated. If the frequency of the second friend sending expression images and the frequency of the user sending expression images meet the second predefined condition, the identity of the second friend may be added to the white list.

Similar to the above process performed for the second friend, it can be determined whether a frequency of each friend excluded from the white list sending expression images and the frequency of the user sending expression images meet the second predefined condition. When determining that a frequency of a friend sending expression images and the frequency of the user sending expression images meet the second predefined condition, an identity of the friend may be added to the white list.

For example, suppose the second friend is friend C. From the chat history of the user A, messages that were generated when the user A chatted with the second friend C in the past are obtained. Suppose among the messages that were generated when the user A chatted with the second friend C in the past, the number of messages sent by the user A is 100, the number of messages containing expression images sent by the user A is 10, the number of messages sent by the second friend C is 100, and the number of messages containing expression images sent by the second friend C is 30. Accordingly, from the obtained history chat messages, the number of messages sent by the user A is counted to obtain a value 100, the number of messages containing expression images sent by the user A is counted to obtain a value 10, the number of messages sent by the second friend C is counted to obtain a value 100, and the number of messages containing expression images sent by the second friend C is counted to obtain a value 30. According to the number of messages containing expression images sent by the user A (i.e., 10) and the number of messages sent by the user A (i.e., 100), the frequency of the user A sending expression images is calculated to obtain a value 0.1. According to the number of messages containing expression images sent by the second friend C (i.e., 30) and the number of messages sent by the second friend C (i.e., 100), the frequency of the second friend C sending expression images is calculated to obtain a value 0.3. Suppose the second predefined condition is that the frequency of the second friend C sending expression images is larger than the frequency of the user A sending expression images, the frequency of the second friend C sending expression images (i.e., 0.3) and the frequency of the user A sending expression images (i.e., 0.1) meet the second predefined condition, and thus the identity of the second friend C may be added to the white list.

When setting the white list according to blocks 201-203, a relationship between an expression image, the number of sending operations performed for the expression image, and an identity of a friend may be stored according to following block 204, so as to provide an expression image to the user according to the number of the user using the expression image.

Block 204: An expression image sent by the user and the number of sending operations performed for the expression image are obtained from messages that were generated when the user chatted with the friend in the past, and a relationship between the expression image, the number of sending operations performed for the expression image and the identity of the friend are stored.

For each friend of the user, messages that were generated when the user chatted with the friend in the past are obtained from the chat history of the user. Each expression image sent by the user is obtained from the obtained messages, and the number of sending operations performed for the expression image by the user is counted. Each expression image sent by the user, the number of sending operations performed for the expression image, and the identity of the friend are stored as a relationship between the expression image, the number of sending operations performed for the expression image, and the identity of the friend.

For each of other friends of the user, according to the above process, each expression image sent by the user when the user chatted with the friend in the past and the number of sending operations performed for the expression image are obtained, and the expression image sent by the user, the number sending operations performed for the expression image and the identity of the friend are stored as a relationship between the expression image, the number of sending operations performed for the expression image and the identity of the friend.

For example, the history chat messages that were generated when the user A chatted with the friend B in the past are obtained from the history chat record of the user A. Expression images Pig1 and Pig2 sent by the user A are obtained from the obtained messages, the number of sending operations performed for the expression image Pig1 by the user A is counted to obtain a value 10, and the number of sending operations performed for the expression image Pig2 by the user A is counted to obtain a value 20. The expression image Pig1 sent by the user A, the number of sending operations performed for the expression image Pig1 (i.e., 10) and the identity IMB of the friend B are stored as a relationship between the expression image, the number sending operations performed for the expression image and the identity of the friend, as shown in Table 1. The expression image Pig2 sent by the user A, the number of sending operations performed for the expression image Pig2 (i.e., 20) and the identity IMB of the friend B are stored as a relationship between the expression image, the number sending operations performed for the expression image and the identity of the friend, as shown in Table 1.

TABLE 1

| expression images | the number of sending operations | identities of friends |
| --- | --- | --- |
| Pig1 | 10 | IMB |
| Pig2 | 20 | IMB |
| ... | ... | ... |

After setting the white list according to blocks 201-204 and storing the relationship between the expression image, the number of sending operations performed for the expression image and the identity of the friend, the expression image may be provided to the user according to following blocks 205-207.

Block 205: An identity of a friend that is currently chatting with the user is obtained. The user may chat with the friend through a social application. When chatting with the friend, the user opens a chat window corresponding to the friend, and chats with the friend in the chat window. When a terminal detects that the user opens a chat window corresponding to a friend in the social application, the terminal obtains an identity of the friend corresponding to the chat window. For example, when detecting that the user A opens a chat window corresponding to the friend B in the social application, the terminal obtains the identity IMB of the friend B corresponding to the chat window, as shown in FIG. 2-2.

Block 206: According to the white list and the identity of the friend, it is determined whether to provide an expression image to the user. If yes, block 207 is performed; otherwise, the flowchart terminates. The terminal obtains the white list corresponding to the user and checks whether the white list includes the identity of the friend. If the white list includes the identity of the friend, the terminal determines to provide an expression image to the user and, thus, block 207 is performed; otherwise, the terminal determines not to provide an expression image to the user and, thus, the flowchart terminates.

For example, the terminal obtains the white list corresponding to the user A, wherein the white list includes IMB and IMC. The terminal checks whether the white list includes the identity IMB of the friend B. If the white list includes the identity IMB of the friend B, the terminal determines to provide an expression image to the user A, and thus block 207 is performed.

Block 207: An expression image matching with chat content input by the user is provided. The chat window includes a text input box. When the user clicks the text input box, a keyboard button is displayed. The user may edit the chat content through clicking the keyboard button, so as to input the chat content in the text input box. In addition, there are a large number of expression images in the server, and the user may download interested expression images from the server through the terminal. Each expression image corresponds to at least one expression word for describing the emotion or meaning expressed by the expression image.

When detecting that the user inputs the chat content in the chat window, an expression word contained in the chat content input by the user is obtained, and an expression image corresponding to the expression word is obtained. According to the identity of the friend and the obtained expression image, the number of sending operations performed for the expression image is determined from the relationship between the expression image, the number of sending operations performed for the expression image and the identity of the friend. According to the number of sending operations performed for the expression image, the expression image is displayed to the user. If the expression image corresponding to the expression meaning word does not exist in the relationship between the expression image, the number of sending operations performed for the expression image and the identity of the friend, the number of sending operations performed for the expression image may be determined as 0.

The number of sending operations performed for each expression image may be calculated, and all expression images may be ordered from the largest number of sending operations to the smallest number of sending operations or from the smallest number of sending operations to the largest number of sending operations, and all ordered expression images are displayed to the user. According to various embodiments, the expression images are ordered from the smallest number of sending operations to the largest number of sending operations. Further, an expression image with the largest number of sending operations may be displayed to the user.

Figures 2, 3:
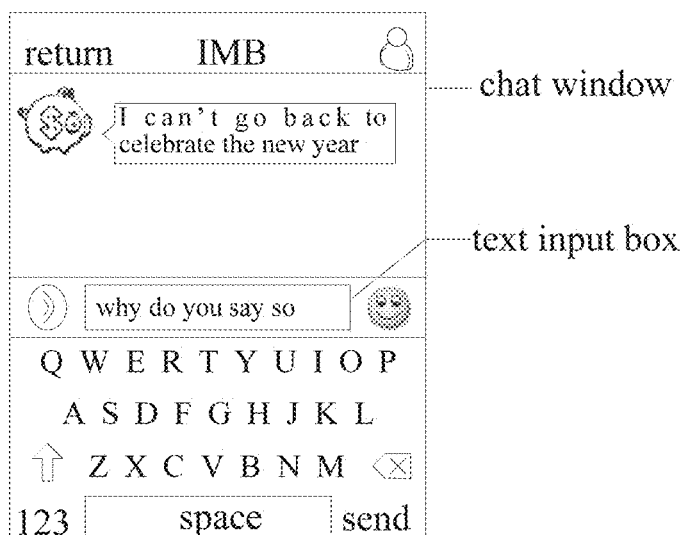
Figures 2, 3, 4:
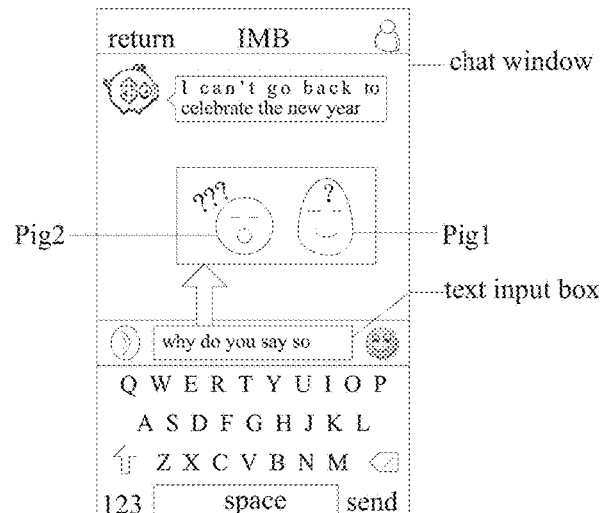
Figure 3:
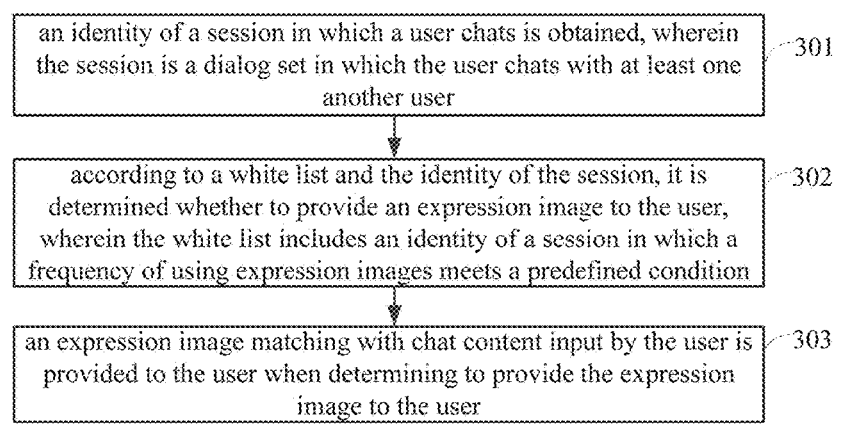
Figure 4:
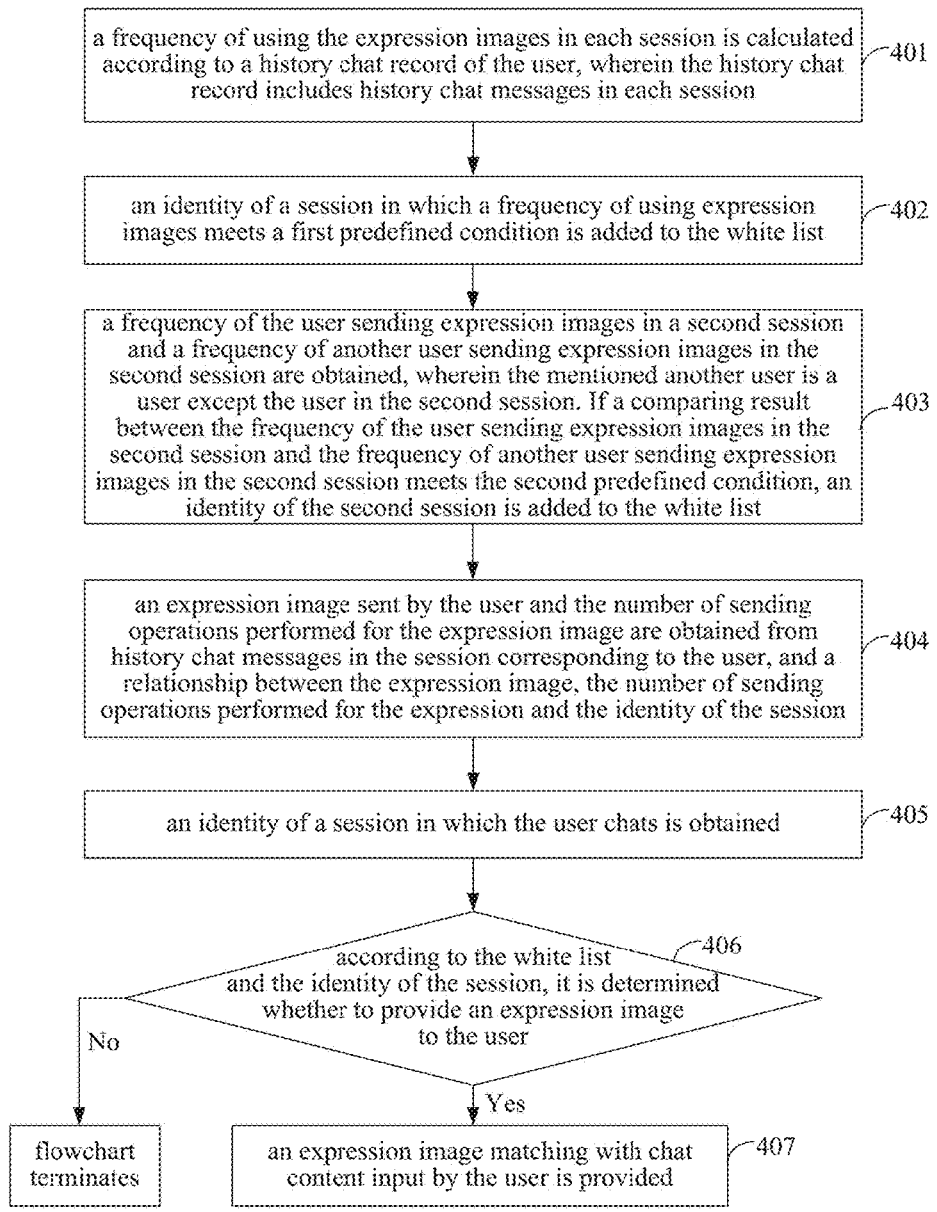

For example, as shown in FIG. 2-3, when detecting that the user A inputs chat content "why do you say so" in the text input box of the chat window, an expression meaning word "why" contained in the chat content "why do you say so" input by the user A is obtained. Expression images Pig1 and Pig2 corresponding to the expression meaning word "why" are obtained. According to the identity IMB of the friend B and the obtained expression images Pig1 and Pig2, from the relationship between the expression images, the number of sending operations and the identities of the friends shown in Table 1, it may be determined that the number of sending operations performed for the expression image Pig1 and the number of sending operations performed for the expression image Pig2 are 10 and 20, respectively. According to the number of sending operations performed for the expression image Pig1 (i.e., 10) and the number of sending operations performed for the expression image Pig2 (i.e., 20), the expression images Pig1 and Pig2 are ordered from the largest number of sending operations to the smallest number of sending operations, and the ordered expression images are Pig2 and Pig1. The ordered expression images Pig2 and Pig1 are displayed to the user A. The displayed chat window is shown in FIG. 2-4.

According to various embodiments of the present disclosure, the identity of the friend that is currently chatting with the user is obtained. According to the white list and the identity of the friend, it is determined whether to provide an expression image to the user. The white list includes an identity of a friend, wherein a frequency of using expression images when the friend in the white list chats with the user meets a predefined condition. When determining to provide an expression image to the user, an expression image matching with the chat content input by the user is provided to the user. Because the identity of the friend is added to the white list if the frequency of using expression images when the friend added to the white list chats with the user meets the predefined condition, it can be determined whether to provide an expression image to the user according to the white list and the identity of the friend. In this way, it can be determined whether it is proper to use expression images when the user chats with the friend, so as to avoid disturbing the user when providing expression images to the user.

In FIG. 3, various embodiments of the present disclosure provide a flowchart illustrating an expression image matching method. The method includes following blocks.

Block 301: An identity of a session in which a user chats is obtained, wherein the session is a dialog set in which the user chats with at least one other user. According to various embodiments, the session is a dialog set in which the user chats with one other user, for example, the session includes a dialog set performed between user A and user B. According to various embodiments, the session is a dialog set that the user chats with more than one another user, for example, the session includes a dialog set performed among the user A, user C, user D, and user E. The other user may be any one of a friend, a followed user, or a stranger of the user in an instant messaging application or a social application. The session is established by the user, the friend or a server. According to various embodiments, the identity of the session is an identity that is used for specially indicating the session in the server, or an identity that is generated according to identities of all or part of users in the session.

Block 302: According to a white list and the identity of the session, it is determined whether to provide an expression image to the user, wherein the white list includes an identity of a session in which a frequency of using expression images meets a predefined condition.

Block 303: An expression image matching with chat content input by the user is provided to the user when determining whether to provide the expression image to the user.

According to various embodiments, before obtaining the identity of the session in which the user chats, the method further includes:
  calculating a frequency of using expression images in each session according to a chat history of the user, wherein the chat history includes messages in each session; and
  adding an identity of a session in which a frequency of using expression images meets a first predefined condition to the white list.

According to various embodiments, a process of calculating the frequency of using expression images in each session according to the chat history of the user includes:
  obtaining messages in a first session from the chat history of the user, wherein the first session is any session of the user;
  counting the number of the obtained messages and the number of messages containing expression images among the obtained messages; and
  calculating the frequency of using expression images in the first session according to the number of the messages containing expression images and the number of the obtained messages.

In various embodiments, a process of adding the session in which the frequency of using expression images meets the first predefined condition to the white list includes:
  adding the identity of the session in which the frequency of using expression images is larger than a predefined frequency threshold to the white list, or calculating an average frequency according to the frequency of using expression images in each session, and adding the identity of the session in which the frequency of using expression images is larger than the average frequency to the white list.

In various embodiments, after adding the session in which the frequency of using expression images meets the first predefined condition to the white list, the method further includes:

obtaining a frequency of the user sending expression images in a second session and a frequency of the other user sending expression images in the second session, wherein the other user is a user except the user in the second session; and if a comparing result between the frequency of the user sending expression images in the second session and the frequency of the other user sending expression images in the second session meets a second predefined condition, adding an identity of the second session to the white list.

In various embodiments, a process of providing the expression image matching with the chat content input by the user includes:

obtaining an expression meaning word contained in the chat content input by the user;

obtaining an expression image corresponding to the expression meaning word;

when there are at least two expression images, according to the identity of the session and the expression images, determining the number of sending operations performed for each of the expression images from a predefined relationship, wherein the predefined relationship is a relationship between the expression images, the number of sending operations, and identities of sessions; and displaying the expression images to the user after ordering the expression images according to the number of sending operations performed for each of the expression images.

In various embodiments, before obtaining the expression meaning word contained in the chat content input by the user, the method further includes:

obtaining an expression image sent by the user and the number of sending operations performed for the expression image from the messages of the user in the session, and storing the expression image, the number of sending operations performed for the expression image, and the identity of the session into the predefined relationship.

In various embodiments, a process of providing the expression image matching with the chat content input by the user includes:

if an average frequency of the user sending expression images in the session is smaller than a predefined average frequency, decreasing a frequency of providing expression images to the user.

In the various embodiments of the present disclosure, the identity of the session in which the user chats is obtained. According to the white list and the identity of the session, it is determined whether to provide an expression image to the user. The white list includes an identity of a session in which a frequency of using expression images meets a predefined condition. When determining to provide an expression image to the user, an expression image matching with the chat content input by the user is provided to the user. Because the identity of the session in which the frequency of using expression images meets the predefined condition is added to the white list, it can be determined whether to provide an expression image to the user according to the white list and the identity of the session. In this way, it can be determined whether it is proper to use expression images in the session, so as to avoid disturbing the user when providing expression images to the user.

In FIG. 4, various embodiments of the present disclosure provide a flowchart illustrating an expression image matching method. A body executing the method may be a terminal. The method includes the following blocks.

Before providing an expression image to a user, a white list corresponding to the user may be set first according to the following blocks 401-403. The white list includes an identity of a session in which a frequency of using expression images meets a predefined condition.

Block 401: A frequency of using the expression images in each session is calculated according to a chat history of the user, wherein the chat history includes messages in each session. The chat history of the user is stored in a server. The chat history of the user includes messages that were generated when the user chatted with another user in each session in a recent period of time. For example, the chat history may include messages that were generated when the user chatted with another user in each session in the past week.

In this block, the terminal sends a request message for transmitting the chat history to the server. The request message contains an identity of the user, so that the server may obtain, according to the identity of the user, the chat history of the user that chats with another user in each session. The terminal receives the chat history sent by the server.

The terminal selects a session from multiple sessions corresponding to the user, and determines the selected session as a first session. The terminal obtains, from the chat history of the user, messages in the first session in which the user chatted with another user. The terminal counts the number of the obtained messages and the number of messages containing expression images among the obtained messages. The terminal calculates a frequency of using expression images in the first session according to the number of the messages containing expression images and the number of the obtained messages. Any session corresponding to the user may be determined as the first session. According to the above process, the terminal may calculate a frequency of using expression images in each session.

In various embodiments, the terminal calculates a ratio of the number of the messages containing expression images in the first session to the number of the obtained messages in the first session, and determines the ratio as the frequency of using expression images in the first session. For example, suppose the first session includes messages that were generated when user A chatted with users B, C, and D, respectively. The terminal obtains the number of all the messages in the first session, i.e., 100, and the number of messages containing expression images among the messages, i.e., 50. The terminal calculates the frequency of using expression images in the first session to obtain a value 0.5.

For another example, suppose a second session includes messages that were generated when the user A chatted with the user C. The terminal obtains the number of all the messages in the second session, i.e., 200, and the number of messages containing expression images among the message, i.e., 40. The terminal calculates a frequency of using expression images in the second session to obtain a value 0.2.

After obtaining the frequency of using expression images in each session according to block 401, the white list may be set according to following blocks 402 and 403.

Block 402: An identity of a session in which a frequency of using expression images meets a first predefined condition is added to the white list. According to different first predefined conditions, block 402 may be implemented through the following first and second methods.

In the first method, the first predefined condition is that a frequency of using expression images is larger than a predefined frequency threshold. Accordingly, the terminal adds an identity of a session in which a frequency of using expression images is larger than the predefined frequency threshold to the white list. The frequency of using expression images in each session compares with the predefined frequency threshold, a session in which a frequency of using expression images is larger than the predefined frequency threshold is selected, and an identity of the selected session is added to the white list. For example, suppose the predefined frequency threshold is 0.4. An identity of session B in which a frequency of using expression images is larger than the predefined frequency threshold 0.4 is added to the white list.

In the second method, the first predefined condition is that of a frequency of using expression images in a session is larger than an average frequency. Accordingly, an identity of the session in which the frequency of using expression images is larger than the average frequency is added to the white list. According to the frequency of using expression images in each session, an average frequency is calculated, and an identity of a session in which a frequency of using expression images is larger than the average frequency is added to the white list. The average frequency may be calculated according to a following method. The frequency of using expression images in each session corresponding to the user is calculated first, and then a sum of all frequencies is calculated to obtain a total frequency. The number of sessions corresponding to the user is counted, a ratio of the total frequency to the number of sessions corresponding to the user is calculated, and is determined as the average frequency.

For example, a frequency of using expression images in each of three sessions corresponding to the user A is calculated to obtain three frequencies 0.5, 0.2 and 0.3, respectively, and a sum of the three frequencies is calculated to obtain a total frequency 1. The number of sessions corresponding to the user A is counted to obtain a value 3, a ratio of the total frequency (i.e., 1) to the number of sessions (i.e., 3) is calculated to obtain a value 0.33, and the ratio 0.33 is determined as the average frequency. The identity (i.e., IM-B) of the session B corresponding to the user A is added to the white list, in which the frequency of using expression images is larger than the average frequency 0.33.

When the average frequency corresponding to the user is smaller than a predefined average frequency, it can be determined that the user uses less expression images and, thus, a frequency of providing expression images to the user may be decreased. The predefined average frequency may be an average value of frequencies of using expression images in all sessions in the social application. Those skilled may count the average frequency of all sessions in the social application, and determine the average frequency as the predefined average frequency.

The frequency of providing expression images to the user may be decreased through following first and second methods.

In the first method, one expression image matching operation is performed for the user for a predefined number of chat messages. For example, one expression image matching operation is performed for the user every three chat messages. Suppose the user inputs five chat messages. When the user inputs the first chat message, the expression image matching operation is performed for the user. When the user inputs the second, third, and fourth chat messages, no expression image matching operation is performed for the user. When the user inputs the fifth chat message, the expression image matching operation is performed for the user.

In the second method, one expression image matching operation is performed for the user for a preset period of time and when the user inputs a chat message. For example, suppose one expression image matching operation is performed for the user every half hour. The user chats with a friend during a period of time from 1:00 to 2:00, and inputs a chat message at 1:00, 1:20, and 1:30, respectively. Accordingly, when the user inputs the chat message at 1:00, one expression image matching operation is performed for the user. When the user inputs the chat message at 1:20, no expression image matching operation is performed for the user. When the user inputs the chat message at 1:30, one expression image matching operation is performed for the user. If the user does not input the chat message at 1:30, no expression image matching operation is performed for the user.

After setting the white list according to block 402, an identity of a session meeting a second predefined condition may be added to the white list according to following block 403.

Block 403: A frequency of the user sending expression images in a second session and a frequency of another user sending expression images in the second session are obtained, wherein the mentioned another user is a user except the user in the second session. If a comparing result between the frequency of the user sending expression images in the second session and the frequency of another user sending expression images in the second session meets the second predefined condition, an identity of the second session is added to the white list.

The second predefined condition may be that the frequency of another user sending expression images in the second session is larger than the frequency of the user sending expression images in the second session, or may be that the frequency of another user sending expression images is a predefined multiple of the frequency of the user sending expression images in the second session. During a chat process in which the user chats with another user, if the frequency of another user sending expression images is high, it can be determined that the user may accept matched expression images. Accordingly, the identity of the second session may be added to the white list corresponding to the user.

In this block, a session is selected from sessions excluded from the white list, and is taken as the second session. History chat messages in the second session in which the user chatted with another user are obtained from the history chat record of the user. According to the obtained history chat messages, the number of messages sent by the user in the second session, the number of messages containing expression images sent by the user in the second session, the number of messages sent by another user in the second session, and the number of messages containing expression images sent by another user in the second session are counted. According to the number of messages containing expression images sent by the user in the second session and the number of messages sent by the user in the second session, the frequency of the user sending expression images in the second session is calculated. According to the number of messages containing expression images sent by another user in the second session and the number of messages sent by another user in the second session, the frequency of another user sending expression images in the second session is calculated. If the frequency of another user sending expression images in the second session and the frequency of the user sending expression images in the second session meet the second predefined condition, the identity of the second session may be added to the white list.

Similar to the above process performed for the second session, it can be determined whether a frequency of sending expression images in each session excluded from the white list and the frequency of the user sending expression images in the session meet the second predefined condition. When determining that the frequency of sending expression images in the session and the frequency of the user sending expression images in the session meet the second predefined condition, the identity of the session may be added to the white list.

For example, suppose the second session is session C. From the chat history of the user A, messages in the second session C are obtained. Suppose in the messages in the second session C, the number of messages sent by the user A is 100, the number of messages containing expression images is 10, the number of messages sent by another user is 100, and the number of messages containing expression images is 30. According to the number of messages containing expression images sent by the user A in the second session C (i.e., 10) and the number of messages sent by the user A in the second session C (i.e., 100), the frequency of the user A sending expression images in the second session C is calculated to obtain a value 0.1. According to the number of messages containing expression images sent by another user in the second session C (i.e., 30) and the number of messages sent by another user in the second session C (i.e., 100), the frequency of another user sending expression images in the second session C is calculated to obtain a value 0.3. Suppose the second predefined condition is that the frequency of another user sending expression images in the second session C is larger than the frequency of the user A sending expression images in the second session C, the frequency of another user sending expression images in the second session C (i.e., 0.3) and the frequency of the user A sending expression images in the second session C (i.e., 0.1) meet the second predefined condition, and thus the identity (i.e., IM-C) of the second session C may be added to the white list.

When setting the white list according to blocks 401-403, a relationship between an expression image, the number of sending operations performed for the expression image and an identity of a session may be stored according to following block 404, so as to provide an expression image to the user according to the number of the user using the expression image.

Block 404: An expression image sent by the user and the number of sending operations performed for the expression image are obtained from messages in the session corresponding to the user, and the expression image, the number of sending operations performed for the expression, and the identity of the session are stored in the predefined relationship.

For each session corresponding to the user, the history chat messages in the session are obtained from the history chat record of the user. Each expression image sent by the user is obtained from the obtained history chat messages, and the number of sending operations performed for each expression image by the user is counted. Each expression image sent by the user, the number of sending operations performed for the expression image and the identity of the session are stored in a predefined relationship.

For example, history chat messages of user A in session X are obtained from the history chat record of the user A. Expression images Pig1 and Pig2 sent by the user A are obtained from the obtained history chat messages, the number of sending operations performed for the expression image Pig1 by the user A is counted to obtain a value 10, and the number of sending operations performed for the expression image Pig2 by the user A is counted to obtain a value 20. The expression image Pig1 sent by the user A, the number of sending operations performed for the expression image Pig1 (i.e., 10) and the identity IM-X of the session X is stored in the predefined relationship shown in Table 2, and the expression image Pig2 sent by the user A, the number of sending operations performed for the expression image Pig2 (i.e., 20) and the identity IM-X of the session X is stored in the predefined relationship shown in Table 2.

TABLE 2

| expression images | the number of sending operations | identities of sessions |
| --- | --- | --- |
| Pig1 | 10 | IM-X |
| Pig2 | 20 | IM-X |
| ... | ... | ... |

After setting the white list according to blocks 401-404 and storing the predefined relationship, the expression image may be provided to the user according to following blocks 405-407.

Block 405: An identity of a session in which the user chats is obtained. When chatting with another user, the user opens a chat window corresponding to the session, and chats with another user in the chat window. In this block, when detecting that the user opens a chat window corresponding to a session in the social application, the terminal obtains an identity of the session corresponding to the chat window.

Block 406: According to the white list and the identity of the session, it is determined whether to provide an expression image to the user. If yes, block 407 is performed; otherwise, the flowchart terminates. The terminal obtains the white list corresponding to the user and checks whether the white list includes the identity of the session. If the white list includes the identity of the session, the terminal determines to provide an expression image to the user and, thus, block 407 is performed; otherwise, the terminal determines not to provide an expression image to the user, and the flowchart terminates.

Block 407: An expression image matching with chat content input by the user is provided. The chat window includes a text input box. When the user clicks the text input box, a keyboard button is displayed. The user may edit the chat content through clicking the keyboard button, so as to input the chat content in the text input box. In addition, there are a large number of expression images in the server, and the user may download interested expression images from the server through the terminal. Each expression image corresponds to at least one expression word for describing the emotion or meaning expressed by the expression image.

When detecting that the user inputs the chat content in the chat window, an expression word contained in the chat content input by the user is obtained, and an expression image corresponding to the expression word is obtained. According to the identity of the session and the obtained expression image, the number of sending operations performed for the expression image is determined from the relationship between the expression image, the number of sending operations performed for the expression image, and the identity of the friend. According to the number of sending operations performed for the expression image, the expression image is displayed to the user. If the expression image corresponding to the expression word does not exist in the predefined relationship, the number of sending operations performed for the expression image may be determined as 0.

In various embodiments, the terminal may calculate the number of sending operations performed for each expression image, order all expression images from the largest number of sending operations to the smallest number of sending operations or from the smallest number of sending operations to the largest number of sending operations, and display all ordered expression images to the user. In various embodiments, the expression images are ordered from the smallest number of sending operations to the largest number of sending operations. Further, the terminal may display an expression image with the largest number of sending operations to the user.

In the various embodiments of the present disclosure, the identity of the session in which the user chats is obtained. According to the white list and the identity of the session, it is determined whether to provide an expression image to the user. The white list includes an identity of a session in which a frequency of using expression images meets a predefined condition. When determining whether to provide an expression image to the user, an expression image matching with the chat content input by the user is provided to the user. Because the identity of the session in which the frequency of using expression images meets the predefined condition is added to the white list, it can be determined whether to provide an expression image to the user according to the white list and the identity of the session. In this way, it can be determined whether it is proper to use expression images in the session, so as to avoid disturbing the user when providing expression images to the user.

Figure 5:
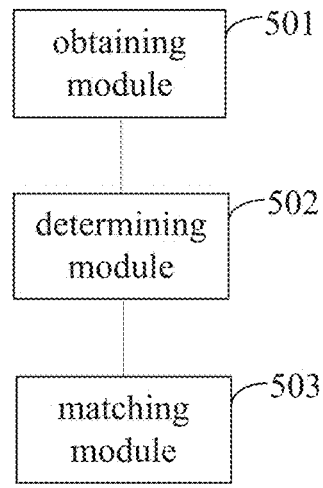
FIG. 5 is a diagram illustrating an expression image matching apparatus according to various embodiments of the present disclosure.

In FIG. 5, various embodiments of the present disclosure provide an expression image matching apparatus. The apparatus includes:

an obtaining module 501, configured to obtain an identity of a session in which a user chats, wherein the session is a dialog set in which the user chats with at least one another user;

a determining module 502, configured to determine, according to a white list and the identity of the session, whether to provide an expression image to the user, wherein the white list includes an identity of a session in which a frequency of using expression images meets a predefined condition; and a matching module 503, configured to provide an expression image matching with chat content input by the user when determining to provide the expression image to the user.

In various embodiments, the apparatus further includes:

a calculating module, configured to calculate a frequency of using expression images in each session according to a chat history of the user, wherein the chat history includes messages in each session; and a creating module, configured to add a session in which a frequency of using expression images meets a first predefined condition to the white list.

In various embodiments, the calculating module includes:

a first obtaining unit, configured to obtain messages in a first session from the chat history of the user, wherein the first session is any session of the user;

a counting unit, configured to count the number of the obtained messages and the number of messages containing expression images among the obtained messages; and a calculating unit, configured to calculate the frequency of using expression images in the first session according to the number of the messages containing expression images and the number of the obtained messages.

In various embodiments, the creating module includes:

a first creating unit, configured to add the identity of the session in which the frequency of using expression images is larger than a predefined frequency threshold to the white list, or a second creating unit, configured to calculate an average frequency according to the frequency of using expression images in each session, and add the identity of the session in which the frequency of using expression images is larger than the average frequency threshold to the white list.

In various embodiments, the apparatus further includes:

an adding module, configured to obtain a frequency of the user sending expression images in a second session and a frequency of another user sending expression images in the second session, wherein the another session is a user except the user in the second session; if a comparing result between the frequency of the user sending expression images in the second session and the frequency of another user sending expression images in the second session meets a second predefined condition, adding an identity of the second session to the white list.

In various embodiments, the matching module 503 includes:

a second obtaining unit, configured to obtain an expression word contained in the chat content input by the user, and obtain an expression image corresponding to the expression word; and a determining unit, configured to determine, when there are at least two expression images, the number of sending operations performed for each of the expression images from a predefined relationship according to the identity of the session and the expression image, wherein the predefined relationship is a relationship between the expression images, the number of sending operations and identities of sessions; and a displaying unit, configured to display the expression images to the user after ordering the expression images according to the number of sending operations performed for each of the expression images.

In various embodiments, the apparatus further includes:

a storing module, configured to obtain an expression image sent by the user and the number of sending operations performed for the expression image from the messages of the user in the session, and store the expression image, the number of sending operations performed for the expression image, and the identity of the session into the predefined relationship.

In various embodiments, the matching module 503, configured to decrease a frequency of providing expression images to the user if an average frequency of the user sending expression images in the session is smaller than a predefined average frequency.

In the various embodiments of the present disclosure, the identity of the session in which the user chats is obtained.

According to the white list and the identity of the session, it is determined whether to provide an expression image to the user. The white list includes an identity of a session in which a frequency of using expression images meets a predefined condition. When determining to provide an expression image to the user, an expression image matching with the chat content input by the user is provided to the user. Because the identity of the session in which the frequency of using expression images meets the predefined condition is added to the white list, it can be determined whether to provide an expression image to the user according to the white list and the identity of the session. In this way, it can be determined whether it is proper to use expression images in the session, so as to avoid disturbing the user when providing expression images to the user.

Figure 6:
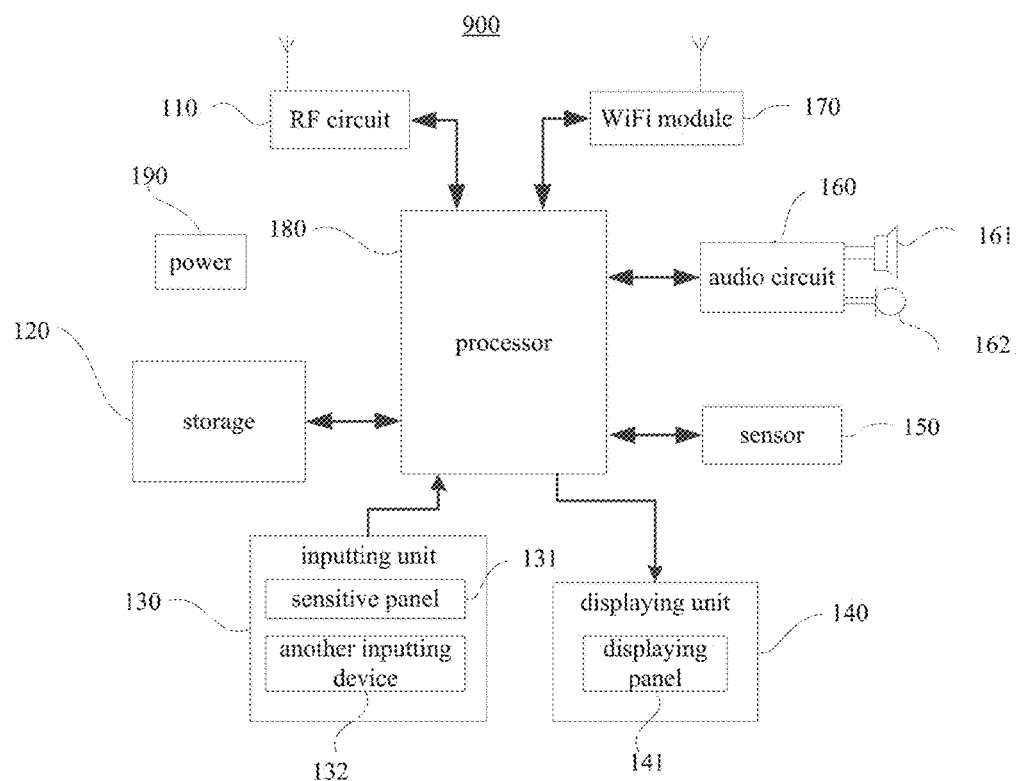
FIG. 6 is a diagram illustrating the structure of a terminal according to various embodiments of the present disclosure.

In FIG. 6, various embodiments of the present disclosure provide a structure of the terminal described in the various embodiments. The terminal may be used to implement the expression image matching method provided by the various embodiments.

A terminal 900 may include a Radio Frequency (RF) circuit 110, a storage 120 including one or more computer readable storage mediums, an inputting unit 130, a displaying unit 140, a sensor 150, an audio circuit 160, a wireless fidelity (WiFi) module 170, a processor 180 including one or more processing units, and a power 190. Those skilled in the art will understand that the terminal is not limited by the structure of the terminal shown in FIG. 6, but can include more or less components than the components in the structure shown in FIG. 6, or can combine some components in the structure shown in FIG. 6, or can have a component arrangement different from the component arrangement in the structure shown in FIG. 6.

The RF circuit 110 may transmit and receive signals during an information transmitting and receiving process or a call process. Particularly, the RF circuit 110 may receive downlink information from a base station and transmit the downlink information to the one or more processors 180. In addition, the RF circuit 110 may transmit uplink data to the base station. Usually, the RF circuit 110 includes, but is not limited to, an antenna, at least one amplifier, a tuner, one or more oscillators, a Subscriber Identity Module (SIM) card, a transceiver, a coupler, a Low Noise Amplifier (LNA), a duplexer, etc. In addition, the RF circuit 110 may also communicate with a network and other communication devices through wireless communication. Any of the communication standards or protocols may be used in the wireless communication, which include, but are not limited to, Global System of Mobile communication (GSM), General Packet Radio Service (GPRS), Code Division Multiple Access (CDMA), Wideband Code Division Multiple Access (WCDMA), Long Term Evolution (LTE), Email, Short Messaging Service (SMS), etc.

The storage 120 may store software programs and modules, and the processor 180 may operate the software programs and modules stored in the storage 120 to implement a variety of functional applications and data processing. The storage 120 may include a program storage area and a data storage area. The program storage area may store an operation system and an application program for implementing at least one function (e.g., an audio playing function, a video playing function and so on). The data storage area may store data created when the terminal 900 is used (e.g., audio data, contact data and so on). In addition, the storage 120 may include a high-speed random access memory and a non-transitory memory, such as at least one disk storage device, flash device or a transitory solid-state storage device. Accordingly, the storage 120 may also include a storage controller to provide the access to the storage 120 for the processor 180 and the inputting unit 130.

The inputting unit 130 may receive an input numeral or character information, and generate signal input of a keyboard, a mouse, an operating lever, optics or a trackball related with user configuration and function control. The inputting unit 130 may include a touch sensitive panel 131 and another inputting device 132. The touch sensitive panel 131 is also called a touch screen or a touch pad, and may collect a touch operation performed by a user on or near the touch sensitive panel 131 (e.g., the user performs an operation on or near the touch panel 131 with any suitable object or accessory such as a finger and a touchpen), and drive a connection device according to a preset program. The touch sensitive panel 131 may include a touch detection apparatus and a touch controller. The touch detection apparatus may detect a touch position of the user, detect a signal generated based on the touch operation, and transmit the signal to the touch controller. The touch controller may receive touch information from the touch detection apparatus, convert the touch information into a touch point coordinate, transmit the touch point coordinate to the processor 180, and receive and execute a command sent by the processor 180. In addition, the touch sensitive panel 131 may be implemented by multiple modes, such as a resistive mode, a capacitive mode, an infrared mode or a surface acoustic wave mode. In addition to the the touch sensitive panel 131, the inputting unit 130 may further include another inputting device 132. The inputting device 132 may include, but is not limited to, at least one of a physical keyboard, a function key (such as a volume control key, a switch key etc.), a trackball, a mouse, and an operating lever.

The displaying unit 140 may display information input by the user or information provided to the user and various graphical user interfaces of the terminal 900. The graphical user interfaces may be constructed by graphics, texts, icons, videos, and any combination thereof. The displaying unit 140 may include a displaying panel 141, which may be configured by a Liquid Crystal Display (LCD) and an Organic Light-Emitting Diode (OLED). Further, the touch sensitive panel 131 may be covered with the displaying panel 141. When detecting the touch operation on or near the touch sensitive panel 131, the touch sensitive panel 131 transmits the touch operation to the processor 180 to determine the type of the touch event. Afterwards, the processor 180 provides a video output on the displaying panel 141 according to the type of the touch event. Although the touch sensitive panel 131 and the displaying panel 141 are used as two independent components to implement an inputting function and an outputting function respectively in FIG. 6, in various embodiments, the touch sensitive panel 131 and the displaying panel 141 may be integrated to implement the inputting function and the outputting function.

The terminal 900 may further include a sensor 150, such as a light sensor, a motion sensor, and another sensor. The light sensor may include an ambient light sensor and a proximity sensor. The ambient light sensor may adjust the brightness of the displaying panel 141 according to the brightness of ambient light. The proximity sensor may close the displaying panel 141 and/or become backlit when the terminal 900 is moved to an ear. As one kind of motion sensor, a gravity accelerometer sensor can detect a value of acceleration on all directions (typically three-axis). The gravity accelerometer sensor may detect the value and direction of gravity in stationary, identify a posture of a mobile phone (such as switch between a horizontal screen and a vertical screen, a related game, magnetometer posture calibration and so on), and implement a vibration recognition related function (such as a pedometer and a percussion). Another sensor such as a gyroscope, a barometer, a hygrometer, a thermometer and an infrared sensor may be configured in the terminal 900, which will not be described in detail herein.

The audio circuit 160, the speaker 161, and the microphone 162 may provide an audio interface between the user and the terminal 900. The audio circuit 160 may transmit to the speaker 161 an electric signal transformed from received audio data. The speaker 161 transforms the electric signal to a sound signal and outputs the sound signal. On the other hand, the microphone 162 transforms the collected sound signal to an electric signal. The audio circuit 160 receives the electric signal, transforms the electric signal to audio data, and outputs the audio data to the processor 180. After the audio data is processed by the processor 180, the audio data is transmitted to another terminal via the RF circuit 110, or is output to the storage 120 for further processing. The audio circuit 160 may also include a headset jack to provide communication between peripheral headset and the terminal 900.

The Wi-Fi module is based on a short-range wireless transmission technology. The terminal 900 may help the user to transmit and receive an email, browse a webpage and access a streaming media through the Wi-Fi module 170. The Wi-Fi module 170 may provide the user with access to a wireless broadband internet. Though the Wi-Fi module 170 is shown in FIG. 6, it can be understood that the Wi-Fi module 170 is not a necessary component of the terminal 900 and may be omitted as necessary without changing the scope of the present disclosure.

The processor 180 is a control center of the terminal 900. The processor 180 is connected with all components of the terminal 900 via various interfaces and circuits, and may implement various functions and data processing of the terminal 900 through operating or executing the software programs and/or modules stored in the storage 120 and calling data stored in the storage 120, thereby overall monitoring the terminal 900. The processor 180 may include one or more processing units. The processor 180 may include an application processor and a modem processor. The application processor may process an operation system, a user interface, and application programs. The modem processor may process wireless communication. It can be understand that the above processor 180 may also not include the modem processor.

The terminal 900 may further include a power 190 (such as battery) for providing power supply to various components. The power 190 may be connected with the processor 180 through a power management system, so as to manage such functions as charging, a discharging and power consumption through the power management system. The power 190 may also include one or more Direct Current (DC) or Alternating Current (AC) powers, a recharging system, a power failure detection circuit, a power converter or an inverter, a power status indicator, etc.

The terminal 900 may further include a camera and a Bluetooth module, which are not shown in FIG. 9. In the various embodiments of the present disclosure, the displaying unit of the terminal 900 is a touch screen display. The terminal 900 may further include storage and one or more programs are stored in the storage. The one or more programs are configured to be executed by the one or more processors. The one or more programs include instructions for performing the following operations of:

obtaining an identity of a friend that is chatting with a user currently;

determining whether to provide an expression image to the user according to a white list and the identity of the friend, wherein the white list includes an identity of a friend, and a frequency of using expression images when the friend in the white list chats with the user meets a predefined condition;

when determining to provide an expression image to the user, providing an expression image matching with chat content input by the user to the user;

obtaining an identity of a session in which a user chats, and the session being a dialog set in which the user chats with at least one another user;

determining, according to a white list and the identity of the session, whether to provide an expression image to the user, and the white list comprising an identity of a session in which a frequency of using expression images meets a predefined condition; and providing an expression image matching with chat content input by the user when determining to provide the expression image to the user.

In various embodiments, the one or more programs further include instructions for performing following operations of:

calculating a frequency of using expression images in each session according to a history chat record of the user, wherein the history chat record includes history chat messages in each session; and adding an identity of a session in which a frequency of using expression images meets a first predefined condition to the white list.

In various embodiments, the one or more programs further include instructions for performing following operations of:

obtaining messages in a first session from the chat history of the user, wherein the first session is any session of the user;

counting the number of the obtained messages and the number of messages containing expression images among the obtained messages; and calculating the frequency of using expression images in the first session according to the number of the messages containing expression images and the number of the obtained messages.

In various embodiments, the one or more programs further include instructions for performing the following operations of:

adding the identity of the session in which the frequency of using expression images is larger than a predefined frequency threshold to the white list, or calculating an average frequency according to the frequency of using expression images in each session, and adding the identity of the session in which the frequency of using expression images is larger than the average frequency to the white list.

In various embodiments, the one or more programs further include instructions for performing the following operations of:

obtaining a frequency of the user sending expression images in a second session and a frequency of the another user sending expression images in the second session, wherein the another user is a user except the user in the second session; and if a comparing results between the frequency of the user sending expression images in the second session and the frequency of the another user sending expression images in the second session meets a second predefined condition, adding an identity of the second session to the white list.

In various embodiments, the one or more programs further include instructions for performing the following operations of:

obtaining an expression meaning word contained in the chat content input by the user;

obtaining an expression image corresponding to the expression meaning word;

when there are at least two expression images, according to the identity of the session and the expression images, determining the number of sending operations performed for each of the expression images from a predefined relationship, wherein the predefined relationship is a relationship between the expression images, the number of sending operations and identities of sessions; and displaying the expression images to the user after ordering the expression images according to the number of sending operations performed for each of the expression images.

In various embodiments, the one or more programs further include instructions for performing the following operations of:

obtaining an expression image sent by the user and the number of sending operations performed for the expression image from the messages of the user in the session, and storing the expression image, the number of sending operations performed for the expression image, and the identity of the session into the predefined relationship.

In various embodiments, the one or more programs further include instructions for performing the following operations of:

if an average frequency of the user sending expression images in the session is smaller than a predefined average frequency, decreasing a frequency of providing expression images to the user.

In the various embodiments of the present disclosure, the identity of the session in which the user chats is obtained. According to the white list and the identity of the session, it is determined whether to provide an expression image to the user. The white list includes an identity of a session in which a frequency of using expression images meets a predefined condition. When determining to provide an expression image to the user, an expression image matching with the chat content input by the user is provided to the user. Because the identity of the session in which the frequency of using expression images meets the predefined condition is added to the white list, it can be determined whether to provide an expression image to the user according to the white list and the identity of the session. In this way, it can be determined whether it is proper to use expression images in the session, so as to avoid disturbing the user when providing expression images to the user.

Those skilled in the art can understand that all or part of processes in the method provided by the above embodiments can be implemented by hardware or by instructing related hardware by a program, and the program may be stored in a computer readable memory. The computer readable memory includes a ROM, a disk, a Compact Disc (CD) and so on.

The foregoing are only some embodiments of the present disclosure and are not used to limit the protection scope of the present disclosure. Any modification, equivalent substitution, and improvement without departing from the spirit and principle of the present disclosure are within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. An expression image matching method, comprising:
    obtaining, by a computing device, an identity of a session in which a user chats, and the session being a dialog set in which the user chats with at least one another user;
    determining, by the computing device, according to a white list and the identity of the session, whether to provide an expression image to the user, and the white list comprising an identity of a session in which a frequency of using expression images meets a predefined condition: and
    providing, by the computing device, an expression image matching with chat content input by the user when determining to provide the expression image to the user;
    before obtaining the identity of the session in which the user chats, the method further comprising:
    calculating, by the computing device, a frequency of using expression images in each session according to a history chat record of the user, wherein the history chat record includes history chat messages in each session; and
    adding, by the computing device, an identity of a session in which a frequency of using expression images meets a first predefined condition to the white list.

2. The method of claim 1, wherein the calculating the frequency of using expression images in each session according to the history chat record of the user comprises:
    obtaining, by the computing device, history chat messages in a first session from history the history chat record of the user, wherein the first session is any session of the user;
    counting, by the computing device, the number of the obtained history chat messages and the number of history chat messages containing expression images among the obtained history chat messages; and
    calculating, by the computing device, the frequency of using expression images in the first session according to the number of the history chat messages containing expression images and the number of the obtained history chat messages.

3. The method of claim 1, wherein adding the identity of the session in which the frequency of using expression images meets the first predefined condition to the white list comprises:
    adding, by the computing device, the identity of the session in which the frequency of using expression images is larger than a predefined frequency threshold to the white list, or
    calculating, by the computing device, an average frequency according to the frequency of using expression images in each session, and adding the identity of the session in which the frequency of using expression images is larger than the average frequency to the white list.

4. The method of claim 3, wherein the providing the expression image matching with the chat content input by the user comprises:
    if an average frequency of the user sending expression images in the session is smaller than a predefined average frequency, decreasing, by the computing device, a frequency of providing expression images to the user.

5. The method of claim 1, after adding the identity of the session in which the frequency of using expression images meets the first predefined condition to the white list, further comprising:
  obtaining, by the computing device, a frequency of the user sending expression images in a second session and a frequency of the another user sending expression images in the second session, wherein the another user is a user except the user in the second session; and
  if a comparing result between the frequency of the user sending expression images in the second session and the frequency of the another user sending expression images in the second session meets a second predefined condition, adding, by the computing device, an identity of the second session to the white list.

6. The method of claim 1, wherein the providing the expression image matching with the chat content input by the user comprises:
  obtaining, by the computing device, an expression meaning word contained in the chat content input by the user;
  obtaining, by the computing device, an expression image corresponding to the expression meaning word;
  when there are at least two expression images, according to the identity of the session and the expression images, determining, by the computing device, the number of sending operations performed for each of the expression images from a predefined relationship, wherein the predefined relationship is a relationship between the expression images, the number of sending operations and identities of sessions; and
  displaying, by the computing device, the expression images to the user after ordering the expression images according to the number of sending operations performed for each of the expression images.

7. The method of claim 6, before obtaining the expression meaning word contained in the chat content input by the user, further comprising:
  obtaining, by the computing device, an expression image sent by the user and the number of sending operations performed for the expression image from the history chat messages of the user in the session, and storing the expression image, the number of sending operations performed for the expression image and the identity of the session into the predefined relationship.

8. An expression image matching apparatus, comprising:
  a processor and a storage, wherein the storage stores computer readable instruction, and the processor executes the computer readable instructions stored in the storage to:
  obtain an identity of a session in which a user chats, and the session being a dialog set in which the user chats with at least one another user;
  determine, according to a white list and the identity of the session, whether to provide an expression image to the user, and the white list including an identity of a session in which a frequency of using expression images meets a predefined condition; and
  provide an expression image matching with chat content input by the user when determining to provide the expression image to the user;
  wherein the processor executes the computer readable instructions stored in the storage to:
  calculate a frequency of using expression images in each session according to a history chat record of the user, wherein the history chat record includes history chat messages in each session; and
  add a session in which a frequency of using expression images meets a first predefined condition to the white list.

9. The apparatus of claim 8, wherein the processor executes the computer readable instructions stored in the storage to:
  obtain history chat messages in a first session from the history chat record of the user, wherein the first session is any session of the user;
  count the number of the obtained history chat messages and the number of history chat messages containing expression images among the obtained history chat messages; and
  calculate the frequency of using expression images in the first session according to the number of the history chat messages containing expression images and the number of the obtained history chat messages.

10. The apparatus of claim 8, wherein the processor executes the computer readable instructions stored in the storage to:
  add the identity of the session in which the frequency of using expression images is larger than a predefined frequency threshold to the white list, or
  calculate an average frequency according to the frequency of using expression images in each session, and add the identity of the session in which the frequency of using expression images is larger than the average frequency threshold to the white list.

11. The apparatus of claim 8, wherein the processor executes the computer readable instructions stored in the storage to:
  obtain a frequency of the user sending expression images in a second session and a frequency of another user sending expression images in the second session, wherein the another user is a user except the user in the second session; if a comparing result between the frequency of the user sending expression images in the second session and the frequency of another user sending expression images in the second session meets a second predefined condition, adding an identity of the second session to the white list.

12. The apparatus of claim 8, wherein the processor executes the computer readable instructions stored in the storage to:
  obtain an expression meaning word contained in the chat content input by the user, and obtain an expression image corresponding to the expression meaning word; and
  determine, when there are at least two expression images, the number of sending operations performed for each of the expression images from a predefined relationship according to the identity of the session and the expression image, wherein the predefined relationship is a relationship between the expression images, the number of sending operations and identities of sessions; and
  display the expression images to the user after ordering the expression images according to the number of sending operations performed for each of the expression images.

13. A terminal, comprising:
  one or more processors and a storage, wherein
  the storage is configured to store one or more programs, and the one or more programs are configured to be executed by the one or more processors, and comprise instructions for performing following operations of:

obtaining an identity of a session in which a user chats, and the session being a dialog set in which the user chats with at least one another user;

determining according to a white list and the identity of the session, whether to provide an expression image to the usher, and the while list comprising an identity of a session in which a frequency of using expression images meets a predefined condition: and providing an expression image matching with chat content input by the user when determining to providing the expression image to the user;

wherein the one or more processors further comprise instructions for performing following operations of:

calculating a frequency of using expression images in each session according to a history chat record of the user, wherein the history chat record includes history chat messages in each session; and adding an identity of a session in which a frequency of using expression images meets a first predefined condition to the white list.

14. The terminal of claim 13, wherein the one or more processors further comprise instructions for performing following operations of:

obtaining history chat messages in a first session from the history chat record of the user, wherein the first session is any session of the user;

counting the number of the obtained history chat messages and the number of history chat messages containing expression images among the obtained history chat messages; and calculating the frequency of using expression images in the first session according to the number of the history chat messages containing expression images and the number of the obtained history chat messages.

15. The terminal of claim 13, wherein the one or more processors further comprise instructions for performing following operations of:

adding the identity of the session in which the frequency of using expression images is larger than a predefined frequency threshold to the white list, or calculating an average frequency according to the frequency of using expression images in each session, and adding the identity of the session in which the frequency of using expression images is larger than the average frequency to the white list.

16. The terminal of claim 13, wherein the one or more processors further comprise instructions for performing following operations of:

obtaining a frequency of the user sending expression images in a second session and a frequency of the another user sending expression images in the second session, wherein the another user is a user except the user in the second session; and if a comparing result between the frequency of the user sending expression images in the second session and the frequency of the another user sending expression images in the second session meets a second predefined condition, adding an identity of the second session to the white list.

17. The terminal of claim 13, wherein the one or more processors further comprise instructions for performing following operations of:

obtaining an expression meaning word contained in the chat content input by the user;

obtaining an expression image corresponding to the expression meaning word;

when there are at least two expression images, according to the identity of the session and the expression images, determining the number of sending operations performed for each of the expression images from a predefined relationship, wherein the predefined relationship is a relationship between the expression images, the number of sending operations and identities of sessions; and displaying the expression images to the user after ordering the expression images according to the number of sending operations performed for each of the expression images.

* * * * *